United States Patent [19]
Barnett et al.

[11] Patent Number: 6,048,026
[45] Date of Patent: Apr. 11, 2000

[54] ADHESIVE SECURED SEAT COVER AND METHOD

[76] Inventors: Karl Frederick Barnett, 483 Henley Dr., Bloomfield Hills, Mich. 48013; Donald Peter Marriott, 2817 Steamboat Springs Dr., Rochester Hills, Mich. 48309; Christopher James Barnett, 4852 Walnut Lake Rd., Birmingham, Mich. 48010; John Leo Breaugh, 3075 Heritage, Troy, Mich. 48083

[21] Appl. No.: 08/223,323

[22] Filed: Apr. 5, 1994

Related U.S. Application Data

[63] Continuation of application No. 07/952,839, Feb. 8, 1993, abandoned, which is a continuation-in-part of application No. 07/567,113, Aug. 13, 1990, abandoned, which is a continuation-in-part of application No. 07/528,559, May 24, 1990, abandoned.

[51] Int. Cl.⁷ .................................................. A47C 27/00
[52] U.S. Cl. ............................................................ 297/229
[58] Field of Search ................................. 297/224, 219.1

[56] References Cited

U.S. PATENT DOCUMENTS

| | | | |
|---|---|---|---|
| 2,904,103 | 9/1959 | Nail | 297/229 X |
| 3,654,059 | 4/1972 | Zisblatt | 297/229 X |
| 3,695,692 | 10/1972 | Williams | 297/229 |
| 4,536,028 | 8/1985 | Jones et al. | 297/229 X |
| 4,676,376 | 6/1987 | Keiswetter | 297/229 X |
| 4,877,288 | 10/1989 | Lee | 297/229 X |
| 4,883,701 | 11/1989 | Rankin et al. | 297/229 X |
| 4,884,839 | 12/1989 | Keiswetter | 297/229 X |
| 4,886,697 | 12/1989 | Perdelwitz et al. | 297/229 X |

FOREIGN PATENT DOCUMENTS

| | | | |
|---|---|---|---|
| 1062196 | 4/1954 | France | 297/229 |
| 2409727 | 6/1979 | France . | |
| 3419728 | 11/1985 | Germany | 297/229 |
| 3500928 | 7/1986 | Germany | 297/229 |
| 116068 | 9/1979 | Japan . | |
| 70690 | 5/1982 | Japan . | |
| 6801786 | 8/1968 | Netherlands | 297/229 |
| 956599 | 6/1961 | United Kingdom . | |

*Primary Examiner*—Jose V. Chen
*Attorney, Agent, or Firm*—Brooks & Kushman PC

[57] ABSTRACT

A temporary protective seat cover (10) having a tab (22) attached by means of a pressure sensitive adhesive (24). The seat cover is manufactured from a continuous strip of tubular blow molded plastic, cut and sealed to create upper (b 18) and lower (20) pockets for enclosing a seat back (14) and bottom (16) respectively. The closure tab (22) is a flap cut from the seat cover (10) and has the adhesive strip (24) applied to it. During installation, the closure tab (22) is pulled around the lower portion of the seat back (14) and bonded to the rear portion of the seat cover (10) covering the seat back. This pulls the seat cover (10) taut over the seat bottom (16) in the area of the base of the seat back to prevent slippage and tearing during use. Also disclosed are other embodiments including a seat cover (90) having a pouch for carrying seat accessories such as headrests (94), a headrest cover (110), an adhesive protective film (82) which remains attached to the seat cover, an adhesive film (82) which transfers an adhesive (84) to a cover; an adhesive film (134) which is integral with the seat cover; and a general purpose cover (150).

17 Claims, 10 Drawing Sheets

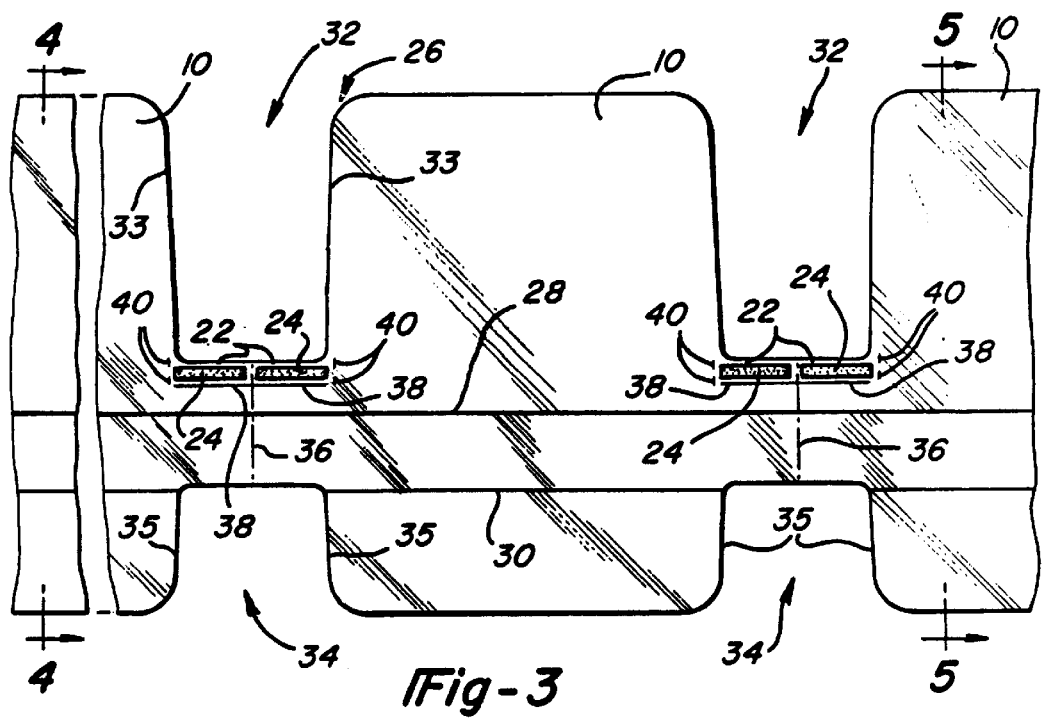
Fig-3
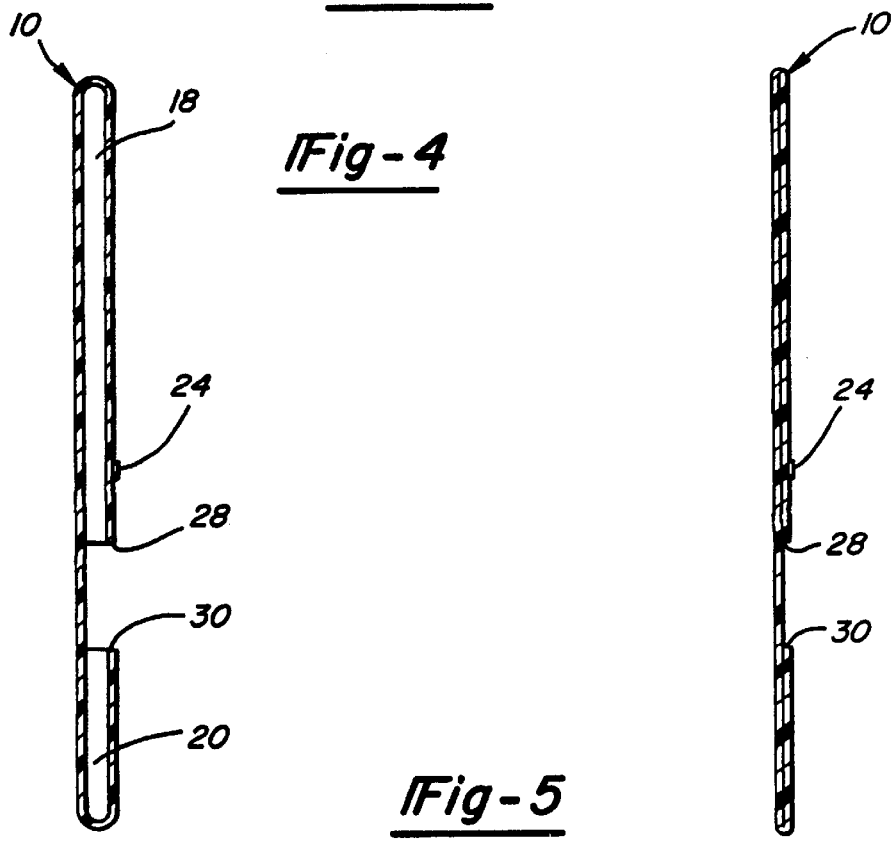
Fig-4
Fig-5

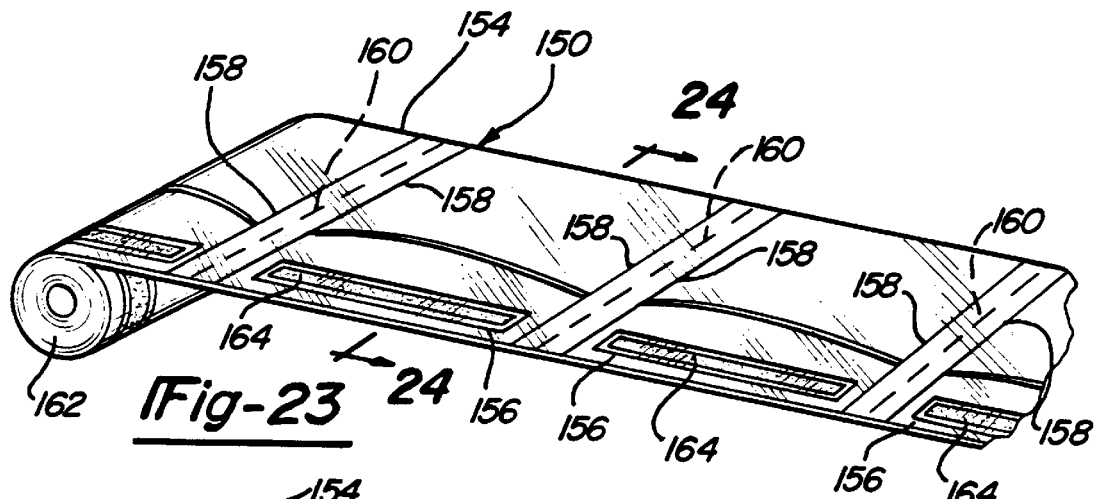
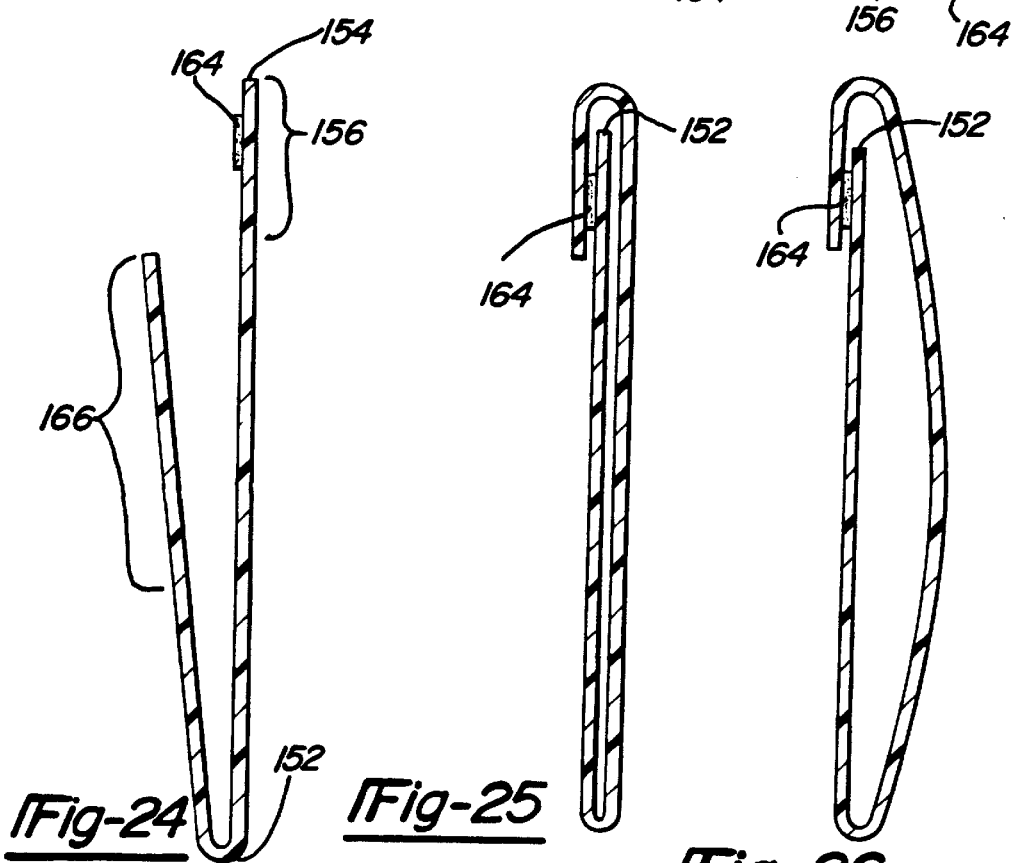

ADHESIVE SECURED SEAT COVER AND METHOD

This is a continuation of U.S. patent application Ser. No. 07/952,839, filed Feb. 8, 1993 now abandoned.

CROSS REFERENCE TO RELATED APPLICATION

This is a continuation-in-part of U.S. application Ser. No. 567,113 filed on Aug. 13, 1990, now abandoned which is a continuation-in-part of U.S. application Ser. No. 528,559, filed on May 24, 1990 now abandoned.

BACKGROUND OF THE INVENTION

This invention relates to seat covers and, more particularly, to temporary disposable seat covers that are secured with an adhesive.

Temporary seat covers are frequently used to protect seats during their manufacturing, shipment or repair. Such seat covers are particularly important in settings such as automobile manufacturing where a seat may be exposed to numerous contaminants from the time the seat is manufactured until it is delivered to a customer. For instance, the manufacturing environment could expose a seat to airborne contaminants such as dust, oil or paint spray. Moreover, once the seat is installed, a number of workers (who may have soiled clothing or hands) must occupy the seat while performing final assembly and test operations and while transporting the vehicle from the factory to the automobile dealership. A temporary seat cover is important to insure that the seat reaches the customer in pristine condition. This increases customer satisfaction and avoids the necessity of subsequent cleaning operations.

Since temporary seat covers are generally disposed of after use, a key requirement for such seat covers is that they are inexpensive. This demands that the seat cover be made of a very low cost material, such as thin plastic sheeting. One drawback with such inexpensive materials is that they are slippery and inherently weak. Consequently, a major problem with conventional temporary seat covers is their tendency to slide on the seat as occupants enter and exit. This can result in the seat cover coming off, or tearing, due to excessive forces exerted on the seat cover at weak points. While some prior seat covers have incorporated external straps or cords to secure the seat cover, in general, these solutions are prohibitively expensive or require too much time to install. In most manufacturing environments and in vehicle manufacturing in particular, fast and simple installation is a critical requirement.

Another problem relating to seat manufacturing operations arises when seat accessories such as headrests are employed. Due to packaging considerations, seat units usually are shipped without the headrests installed. This is often because seats will not fit shipping racks with the headrests installed or because automotive seats cannot be loaded onto the vehicle with the headrest on due to clearance considerations. As a result, headrests frequently must be shipped separately and installed later, adding greatly to shipping, handling and assembly costs.

Thus, there is a need for a means to attach headrest or accessories to a seat prior to their installation and also for a means to protect headrests separately before and after the headrest is installed.

Also, there is a general need for a multi-purpose cover to protect goods during shipment and assembly. Previous covers often require the use of external fasteners such as staples, tape, etc. to secure the cover to the goods or to secure multiple goods together.

Thus it is an object of the present invention to provide a temporary seat cover that has a low unit cost. It is a related object to provide a seat cover that is manufactured of inexpensive materials and utilizes inexpensive manufacturing processes while maintaining adequate strength.

It is another object of the present invention to provide a temporary seat cover that, once secured to the seat, will not easily slide, shift or tear during use.

It is a further object of the present invention to provide a seat cover that is easily and quickly installed and secured to a seat and that does not require external securing means.

It is a further object of the present invention to provide a method for quickly and securely applying a temporary seat cover to a seat.

It is another object of the present invention to provide a seat cover which can also hold seat accessories such as headrests to avoid the necessity of separate shipping and handling of the accessory.

It is an additional object of the present invention to provide a separate temporary headrest cover.

It is another object of the present invention to provide a protective cover for various kinds of goods which can securely enclose the goods and secure multiple goods together without the necessity of external fastening devices.

SUMMARY OF THE INVENTION

According to one embodiment of the present invention, a temporary seat cover is provided for protecting a seat during manufacturing, shipping or repair operations. The seat cover generally comprises a two-layer flexible member with selected edges sealed together. On one side the seat cover is slit to form upper and lower pockets for enclosing a seat back and seat bottom respectively. In addition, a flap is cut from the flexible member in such a way that the base of the flap remains connected to the flexible member. An adhesive means is then attached to one side of the flap or to the seat cover back. Once the seat cover is installed on the seat the flap may be wrapped around a portion of the seat and adhered to the other side of the pocket to secure the seat cover to the seat. The resulting seat cover is inexpensive to manufacture in a single piece, is easily and quickly installed, and secures the seat cover in a way that minimizes slippage and tearing during use.

In accordance with another aspect of the present invention, a temporary seat cover is provided having a two-layer flexible member with at least on pocket for enclosing a portion of a seat therein. The two-layer flexible member is formed on a continuous tube or sheet and a series of perforations on the seat cover separate it from adjacent seat covers on the continuous sheet where the perforations are formed by fusing localized areas in the two-layer flexible member. A flap is connected to the flexible member and an adhesive strip disposed between the flap and the flexible member enabling the flaps to secure the seat cover to the seat by attaching the flap to a portion of the flexible member. A release liner is disposed on the adhesive strip to substantially cover the adhesive. The release liner lies across the perforation and is fused to the two-layer flexible member by the formation of the perforation. In this way, the release liner will remain attached to the seat cover after being peeled off of the adhesive strip. In accordance with a further embodiment, the release liner carries the adhesive strip to the flexible member whereupon the adhesive strip bonds to the flexible member permitting the release liner to be peeled off the adhesive strip.

In accordance with a further embodiment of the present invention, a temporary seat cover includes a two-layer flexible member having a pouch for enclosing one portion of the seat. A second pouch is attached to the two-layer flexible member for carrying a seat accessory such as a headrest so that the seat and accessory can be handled as a unit.

In accordance with still another aspect of the present invention, a temporary seat cover for an automotive seat headrest comprises a continuous plastic sheet having a horizontal fold wherein the sheet forms a bottom layer and top layer. The cover has a horizontal opening opposite the fold and the top and bottom layers are sealed along vertically extending edges. Vertical lines of perforation adjacent to the sealed edges permit separation of adjacent seat covers. A release film or liner carries two removably attached adhesive strips. The film is disposed so that the adhesive strips attach to the top surface of the seat cover with the adhesive strips on opposite sides of the perforation. The release film is sealed along with the sealed edges so that when the release film is peeled off the adhesive strip, the film remains attached to the seat cover at the seal point.

In accordance with an additional embodiment of the present invention, a temporary seat cover comprises a two-layer flexible member having at least one pocket for enclosing a portion of a seat therein. The two-layer flexible member formed on a continuous sheet having a series of perforations for permitting the seat cover to be separated from adjacent seat covers on the continuous sheet. The perforations are formed by fusing localized areas in the two-layer flexible member. A flap is connected to the flexible member and an adhesive strip is disposed between the flap and the flexible member enabling the flap to secure the seat cover to the seat by attaching the flap to a portion of the flexible member. The pocket has an extending portion folded over to removably attach to the adhesive strip. In this way, the extending portion will protect the adhesive strip until it is desired to attach the flap to a portion of the flexible member.

In accordance with an additional embodiment of the present invention, a temporary seat cover has a two-layer flexible member having an upper pocket for enclosing a seat back therein and a lower pocket for enclosing a seat cushion therein. A flap is connected at its base to the flexible member. The flap is substantially rectangular with the longer side of the rectangle comprising its base. An adhesive patch is attached to the flap and the flap is adapted to be wrapped around a portion of the seat and adhered to the other side of the pocket covering the seat to secure the seat cover to the seat.

In accordance with still another embodiment of the present invention, a bag is provided for enclosing goods, the bag comprising a generally rectangular plastic sheet having a horizontal fold so that the sheet forms a bottom layer and a top layer of the bag. The bottom layer has a flap portion extending horizontally upward and beyond the horizontal edge of the top layer opposite the fold. The flap has an adhesive means on its front surface, the top and bottom layers being sealed along vertically extending adjacent edges to form an open pouch. The flap may be folded over the top layer to substantially enclose the interior of the bag. Also, the plastic sheet is comprised of a long continuous strip of material permitting multiple bags to be formed therefrom, the plastic sheet having perforated vertical lines between adjacent bags to permit separation of the bags.

Other objects, features, and advantages of the present invention will become apparent from the subsequent description and the appended claims, taken in conjunction with the accompanying drawings.

BRIEF DESCRIPTION OF THE DRAWINGS

FIG. 3 is a plan view of a portion of a continuous roll of temporary seat covers manufactured in accordance with the present invention.

FIG. 4 is a cross-sectional view of the roll of seat covers taken along line 4—4 in FIG. 3.

FIG. 5 is a cross-sectional view of the roll of seat covers taken along line 5—5 in FIG. 3.

FIG. 22 is a cross-section view of the entire seat cover shown in FIG. 21.

FIG. 23 is a perspective view of a roll of protective bags in accordance with another embodiment of the present invention.

FIG. 24 is a cross-sectional view of the protective bag of FIG. 23 taken along line 24—24.

FIG. 25 is a cross-sectional view of the bag shown in FIG. 23.

FIG. 26 is a cross-sectional view of the bag shown in FIG. 23.

DESCRIPTION OF THE PREFERRED EMBODIMENTS

Figure 1:
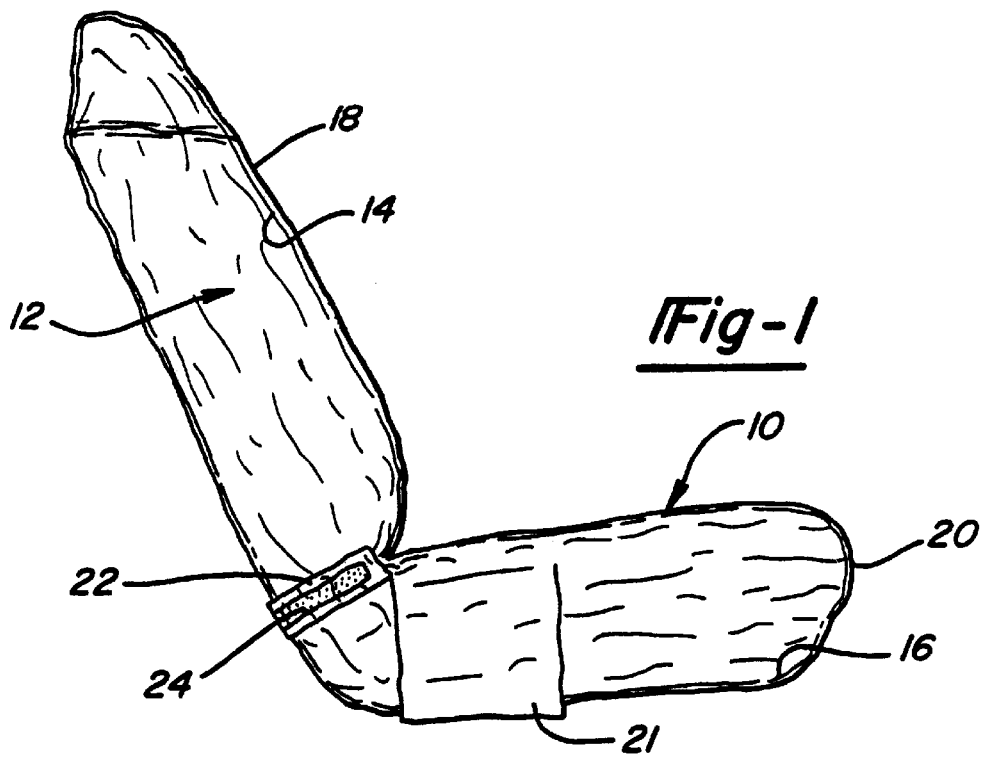
FIG. 1 is a side view of an automotive seat with the temporary seat cover installed in accordance with present invention.

Referring now to FIG. 1, an improved temporary seat cover 10 is shown. The seat cover 10 is installed on an automotive seat 12 which comprises an automotive bucket-type seat including a seat back 14 and a seat cushion or bottom 16. It will be appreciated that the seat cover 10 in accordance with the present invention can be used with a variety of seats, automotive and non-automotive. The seat cover 10 includes an upper pocket 18 which substantially encloses the seat back 14 and a lower pocket 20 which encloses the seat bottom 16. Side Flaps 21 hang along the sides of the seat bottom 16 to provide further protection to the seat 12.

Figure 2:
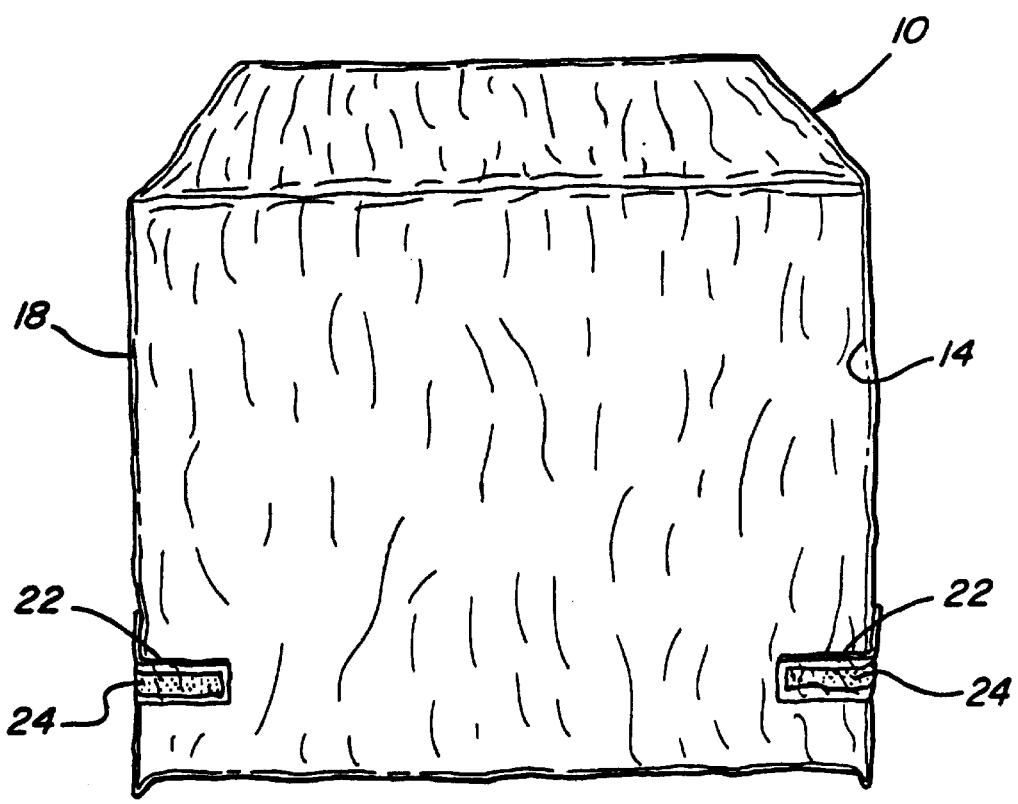
FIG. 2 is a rear view of the automotive seat and seat cover shown in FIG. 1.

Attached to the seat cover 10 is an integral closure tab 22 which is wrapped around the sides of the seat back 14 near the junction of the seat back 14 and seat cushion 16. As better illustrated in FIG. 2, a pair of closure tabs 22 are wrapped around both sides of the seat back 14 and attached to the rear of the upper pocket 18 by means of an adhesive 24 attached to the closure tabs 22 or upper pocket 18. In this way, the seat cover 10 is tightly constrained about the base of the seat back 14 to effectively prevent the seat cover 10 from sliding or slipping when sat upon.

A preferred production version of the seat cover 10 is illustrated in FIGS. 3–5. FIG. 3 illustrates a continuous strip 26 of seat covers 10 which may be mounted on a roll (not shown). FIGS. 4 and 5 illustrate cross-sections of the continuous strip 26 showing that the seat covers 10 are manufactured in a generally tubular shape. It will be appreciated that the continuous strip 26 of seat covers 10 can be produced in the desired tubular shape by means of conventional plastic processing such as blown extrusion. Once the tubular strip 26 has been created, it is then slit along lines 28 and 30 to create upper pocket 18 and lower pocket 20.

Next, the desired shape for the seat cover 10 is created by cutting out and sealing U-shaped cut-outs 32 and 34 along lines 33 and 35. The sealing and cutting operation for the U-shaped cut-outs 32 and 34 may be accomplished using a conventional hot wire technique to achieve simultaneous cutting and sealing. Also, perforated lines 36 are created between adjacent covers 10 to facilitate separation of adjacent covers 10 from the strip 26 by hand tearing. The hot wire technique may also be employed to create the perforations 36.

Closure tabs 22 are created by cutting and sealing along lines 38. This will create a flap that forms the closure tab 22 once the covers 10 are separated at the perforation lines 36. To permit bonding of closure tab 22 to the upper pocket 18 during installation, an adhesive strip 24 is applied to each closure tab 22. The adhesive strip 24 may be applied in a number of ways. For instance, in the preferred embodiment they consist of sprayed on hot melt acrylic adhesive. A suitable hot melt acrylic adhesive such as HRJ-10848, is manufactured by Schenectady Chemicals of Schenectady, N.Y. The spray equipment is in registered placement for precise location of the pressure sensitive adhesive. To facilitate the adhesion of the hot melt acrylic adhesive spray, the area where the adhesive 24 is to be sprayed may first be treated with a process such a corona discharge. This will help insure that the adhesive 24 will remain affixed in the proper location and will not stick instead to the back face of the adjacent cover when the strip 26 is rolled up. In this regard, it is important that areas which do not have adhesive applied are not treated with the corona process. For example, area 39 in FIG. 4 in particular should be left untreated to prevent adhesive from an adjacent seat cover on the roll from sticking to this area. Also, it should be noted that where it is desired to apply printing to the seat cover corona treatment will likewise facilitate adhesion.

To increase the strength of the closure tabs 22, a pair of seal points 40 are placed near the base of each closure tab 22. It will be appreciated that without seal points 40 the bulk of the forces on the installed and bonded closure tabs 22 will be exerted on a single layer of the seat cover 10. That is, the layer on which the adhesive 24 is applied will receive the most stress. However, with seal points 40 in place, both layers of the seat cover 10 are bonded together near the base of the closure tabs 22. As a result, both layers, instead of a single layer of the seat cover 10 will be supporting forces on the closure tab 22. This reduces the likelihood that the tab or other areas of the seat cover 10 will tear when a person sits on the seat 12.

Figure 6:
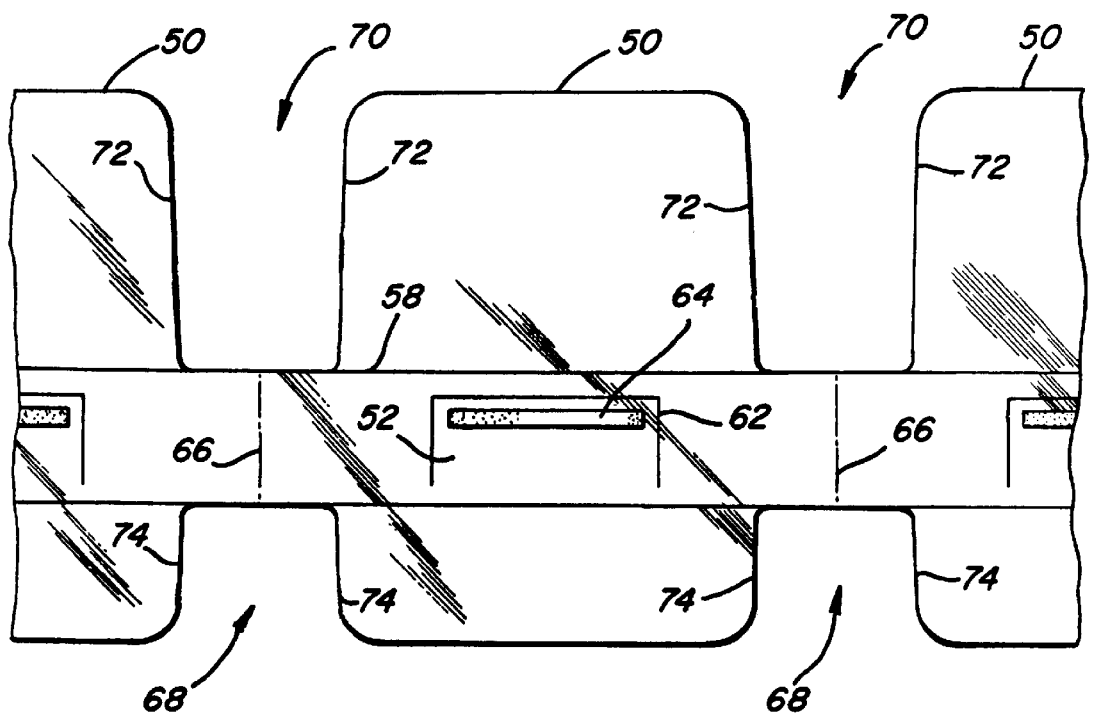
FIG. 6 is a plan view of a portion of a continuous roll of temporary seat covers manufactured in accordance with an alternate embodiment of the present invention.
Figure 7:
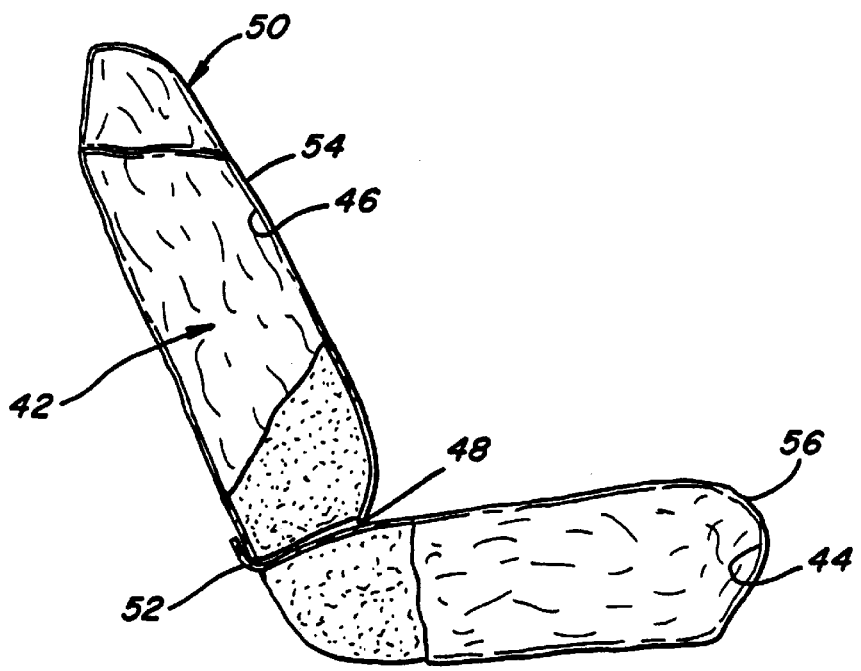
FIG. 7 is a plan view of a portion of a continuous roll of temporary seat covers manufactured in accordance with an additional alternate embodiment of the present invention.

Referring now to FIGS. 6 & 7, alternative preferred embodiments of the seat cover shown in FIGS. 1–5 are shown. These embodiments differ in the positioning of the adhesive. In particular, in FIG. 6 adhesive 41 is located on the rear surface of the upper pocket 18 instead of on the tabs 22. Placement of the adhesive 41 on the upper pocket 18 has the advantage of ensuring correct placement of the tabs 22 during assembly since the tabs 22 must be installed at the locations of the adhesive 41. In the embodiment shown in FIG. 3 it is possible for the tabs 22 to be adhered to an improper location either before or during assembly.

A similar embodiment is shown in FIG. 7, with the further modification of the adhesive 43 to extend substantially across the entire upper pocket 18. This embodiment, while having the advantages of the embodiment of FIG. 6, also has the further advantage of permitting a wider range of adjustability of the placement of the flaps 22. In addition, greater adjustability permits a seat cover 50 of a given size to be used interchangeably on a wider range of seat sizes.

Figure 8:
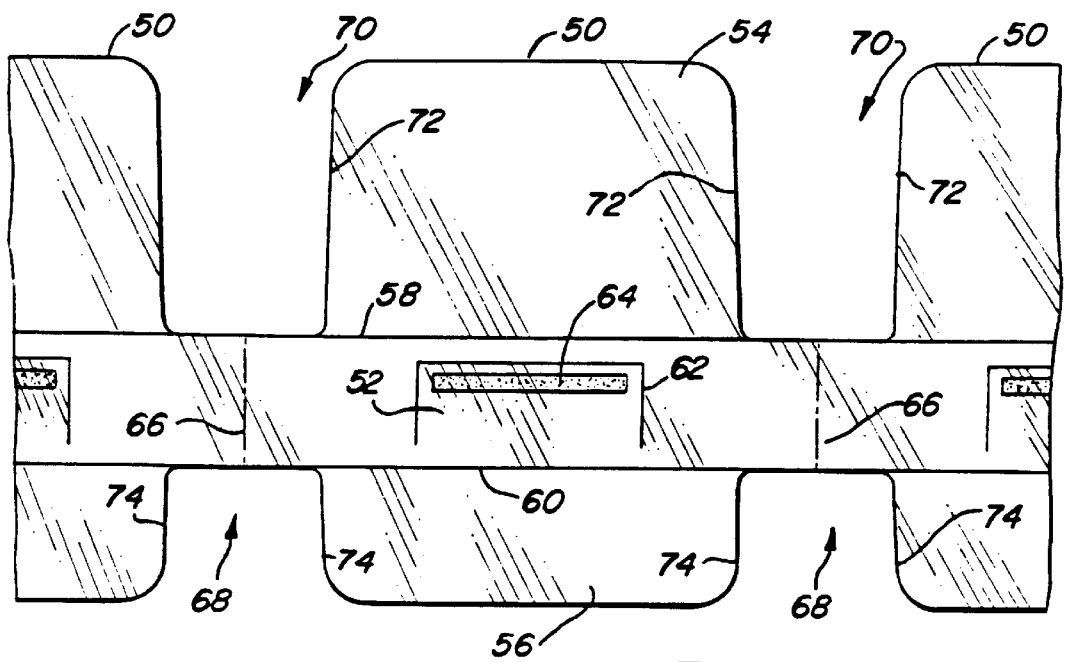
FIG. 8 is a view of a seat cover in accordance with a further embodiment of the present invention for use with coupe-type seats.
Figure 9:
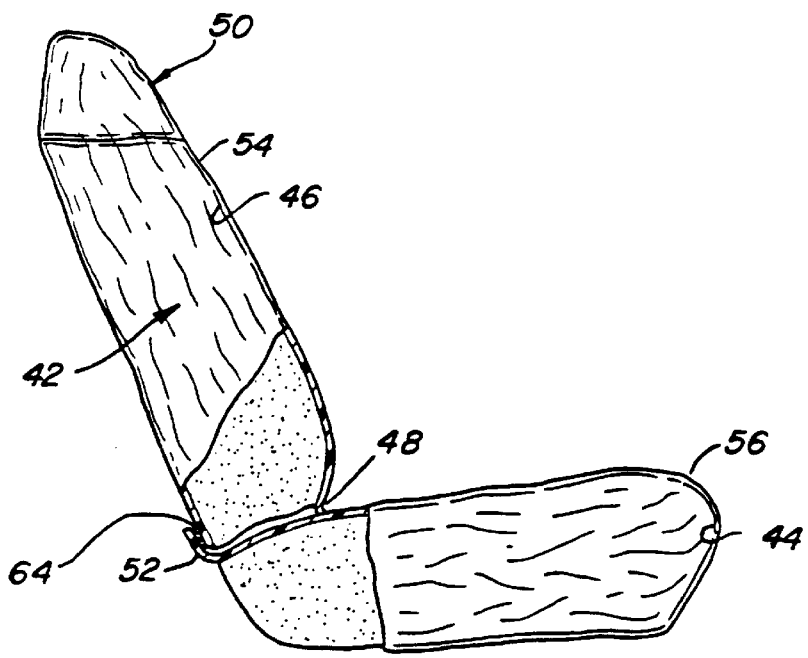
FIG. 9 is a side view of an automotive coupe-type seat with the seat cover shown in FIG. 8 installed.

Referring now to FIGS. 8 & 9 another embodiment of the present invention adapted to be used with coupe type seats is shown. The coupe type seat 42 comprises a seat bottom 44 and seat back 46. In the typical coupe seat 42, the seat back 44 is mounted on a hinge mechanism (not shown) in such a way that it may be folded forward to permit access to a rear storage compartment. A key distinction with the coupe seat 42 is that a significant gap 48 exists between the base of the seat back 46 and the seat bottom 44. In general, the seat cover 50 in accordance with this embodiment of the present invention utilizes a tabs 52 that is inserted into this gap 48 between the seat back 46 and the seat bottom 44. The tab 52 may then be pulled upward and bonded to the back of the seat cover 50. Thus, it will be appreciated that the seat cover 50 can be utilized with any seat in which there is sufficient gap 48 between the seat back 46 and the seat bottom 44 to permit tab 52 to be inserted therein.

Seat cover 50 includes and upper pocket 54 for enclosing the seat back 46 and a lower pocket 56 for enclosing the seat bottom 44. Seat cover 50 is manufactured in a manner similar to the seat cover 10 depicted in FIGS. 3–5. As best seen in FIG. 8 the tubular seat cover 50 is slit along lines 58 and 60 to create the upper 54 and lower 56 pockets. Closure tab 52 is formed by cutting the top surface of the cushion 50 along line 62. An adhesive strip 64 is applied to the closure tab 52 in a manner similar to the adhesive strips 24 shown in FIGS. 1–5. The area is first treated with a corona discharge process, then a hot melt acrylic adhesive is sprayed on. As viewed in FIG. 8, adhesive 64 is placed on the back side of flap 62 to permit attachment to the upper pocket 54 as shown in FIG. 9. Seat cover 50 is separated from adjacent seat covers by tearing along a perforated strip 66. In addition, cut out portions 68 & 70 are created by cutting and sealing with a hot wire along lines 72 & 74 as discussed above. It should be noted that the closure tab 52 is made of a single layer of plastic where the previous closure tabs 22 were made of double layers. However, adequate strength is achieved by substantially increasing the width of closure tab 52 to distribute forces over a much larger area and thus insuring adequate strength against tearing.

To install seat cover 50 the installer simply tears the next seat cover off the roll along perforated lines 66, and slips upper pocket 54 over the seat back 46 and the lower pocket 56 over the seat bottom 44. Next, the closure tab 52 is pushed through the gap 48 between the seat back 46 and bottom 44 and closure tab 52 is pulled upward to tighten seat cover 50 and bond the closure tab 52 to the back of the seat cover 50. As a result, the seat cover 50 may be quickly and easily installed. Also, the seat cover 50 will be securely attached to the seat 42 and will not be subject to shifting or tearing by seat occupant due to the location and design of the closure tab 52.

Figure 10:
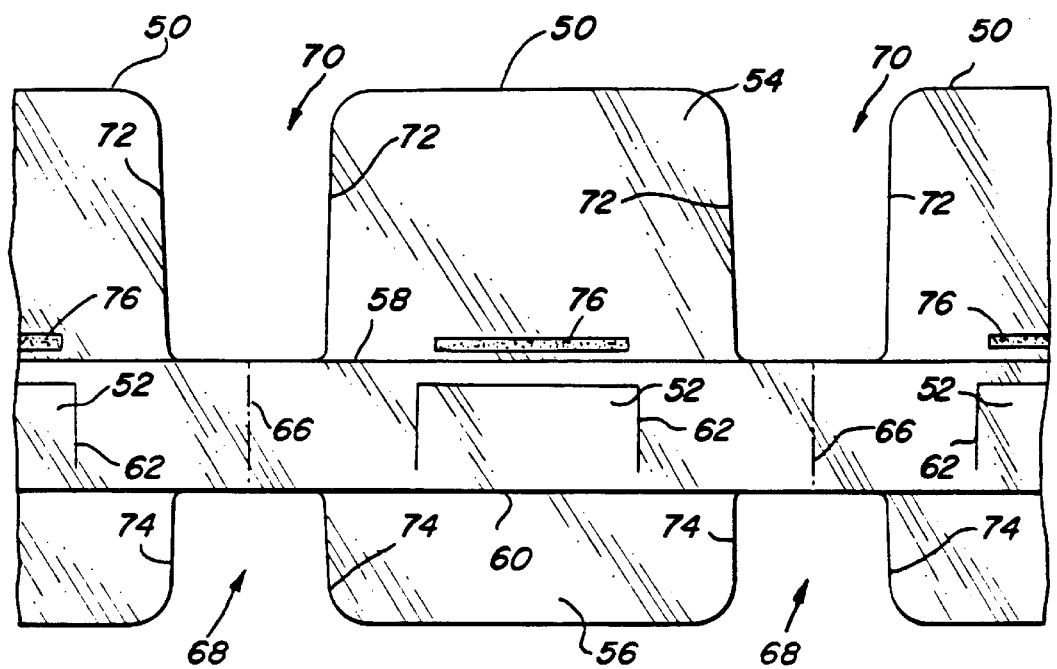
FIG. 10 is a plan view of an alternate embodiment of a seat cover for use with coupe-type seats.

Referring now to FIG. 10 there is shown another embodiment of the seat cover 50 wherein adhesive 76 is attached to the back side of upper pocket 54 instead of to the flap 62. As discussed above in connection with FIGS. 6 & 7, this ensures correct placement of the flap 62. Also, since flap 62 must be pushed through gap 48, this alternate placement of adhesive 76 shown in FIG. 10 will prevent sticking of the flap 62 during this insertion procedure. When applied to the seat 42, the seat cover shown in FIG. 10 will appear substantially like the one shown in FIG. 9 with the substitution of adhesive 76 for adhesive 64.

Figure 11:
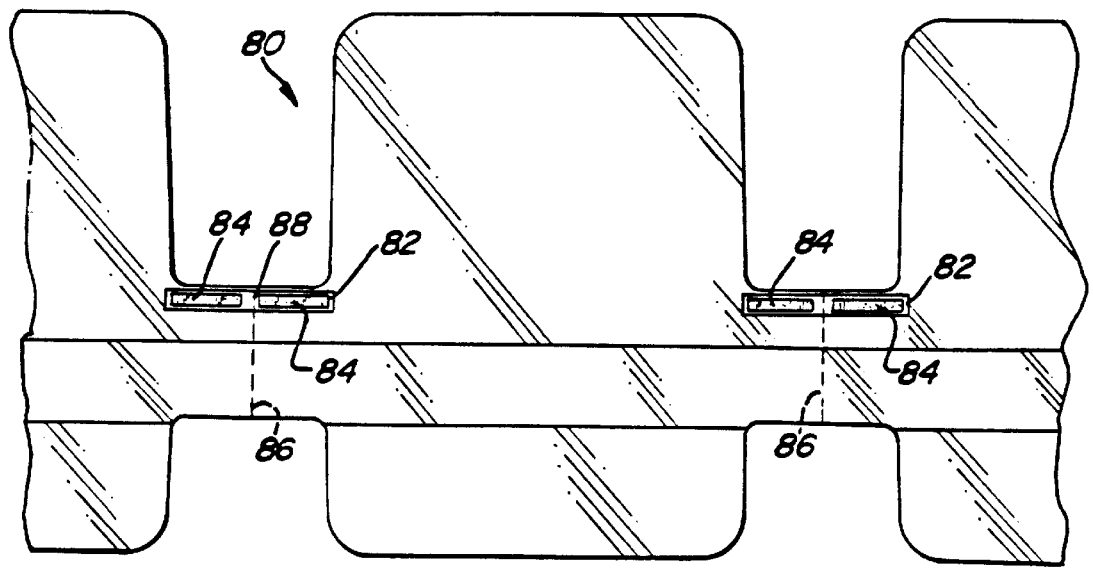
FIG. 11 is a plan view of a portion of a continuous roll of temporary seat covers manufactured in accordance with an alternative embodiment of the present invention having a release liner attached.
Figure 12:
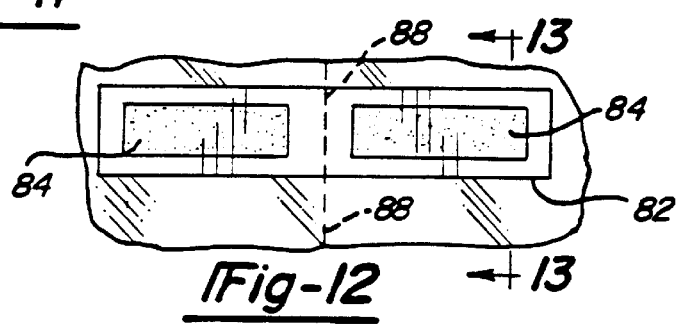
FIG. 12 is a view of the release liner shown in FIG. 11.
Figure 13:
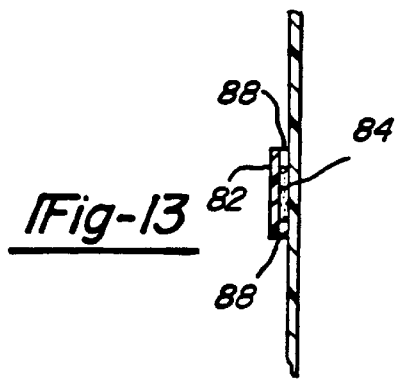
FIG. 13 is a cross-sectional view of the release liner taken along line 13—13 of FIG. 12.

Referring now to FIGS. 11–13 a seat cover 80 in accordance with an additional embodiment of the present invention is shown. The seat cover 80 is similar to the seat cover 10 shown in FIG. 3 but with the addition of a release liner 82. In some instances during use of the seat cover 10 shown in FIG. 3 it is possible for the adhesive 24 to become stuck to objects or to adjacent covers prior to attachment of the seat cover 10 to the seat 12. Thus, to eliminate the possibility of inadvertent sticking during shipment or assembly operations, a release liner 82 is placed over the adhesive 84 as shown in FIG. 11. In order to reduce the number of strips required, a single release liner 82 is utilized to cover two adjacent adhesive strips 84. The release liner may be manufactured from a number of materials such as paper, polypropylene or polyethylene film. In the preferred embodiment the release liner 84 is manufactured from colored polyethylene film, the color facilitating the visibility of the liner during its removal.

An additional advantage with the release liner 84 is that the liner may be left attached at intermediate stages of assembly to permit ease of removal of the seat cover 80 for reworking and inspection operations. Once such operations have been completed, the release liner 82 may be removed and adhesive attached as described above for secure attachment of the seat cover 80 to the seat 12. one drawback with release liners generally is that after their removal they are discarded and sometimes left on the floor. This creates a housekeeping problem since numerous release liners in a manufacturing facility must be cleaned up, or else extra time is required to place them in containers immediately upon removal. This disadvantage is solved by the release liner 82 by installing the release liner 82 prior to the formation of a perforation line 86. It will be appreciated that perforations 86 may be formed in the same manner as perforation 36 described above in connection with FIG. 3. As a result, the formation of perforations 86 will cause the release liner 82 to be fused to the seat cover 80 at fusion points 88. As a result, after the seat covers 80 are separated along perforations 86 and the release liner 82 is pulled off of the adhesive 84, the liner will remain attached to the seat cover at fusion points 88. In this way there will be no scrap release liners which would otherwise require additional manual steps for their disposal. It will be appreciated that the adhesive strip 84 may be applied to the seat cover 80 by means of a sprayed on hot melt acrylic applied to a portion of the seat cover 80 treated with a corona discharge process. Since the release liner 82 will remain untreated, the adhesive 84 will remain secure to the seat cover when the release liner 82 is removed rather than sticking to the liner 82.

In another embodiment the release liner 82 employs the liner to provide an easier method to apply the adhesive strip 84 itself. In particular, the adhesive 84 may be first applied to the release liner 82 instead of being applied to the seat cover 80. The release liner 82 will, of course, not be treated with a corona discharge, while the seat cover 80 will be treated to ensure that the adhesive later sticks to the seat cover and not the liner. Thus, when the liner 82, having adhesive 84 previously applied to it, is positioned on the seat cover 80 as shown in FIG. 11, the adhesive 84 will securely adhere to the treated seat cover 80, and will remain their after the liner 82 is removed. This embodiment is particularly advantageous since it has been found that it is easier to apply the adhesive to release liners 82 than it is to apply the adhesive 84 to the seat cover 80 itself by means of the hot melt acrylic process.

Figure 14:
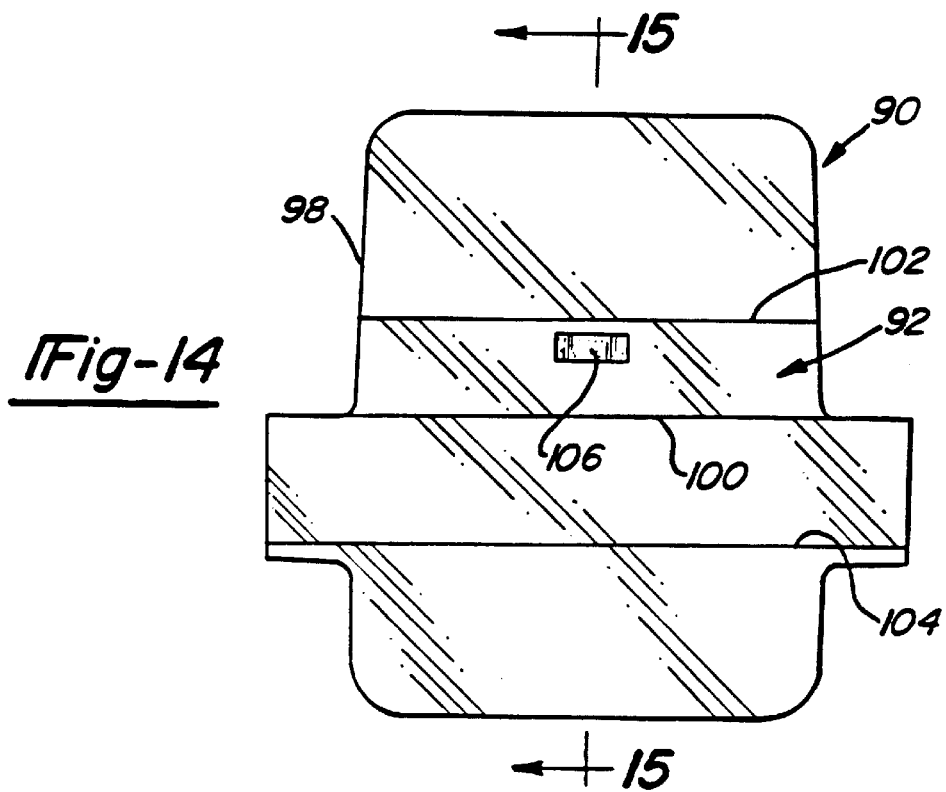
FIG. 14 is a view of a seat cover having a headrest pouch in accordance with additional embodiment of the present invention.
Figure 15:
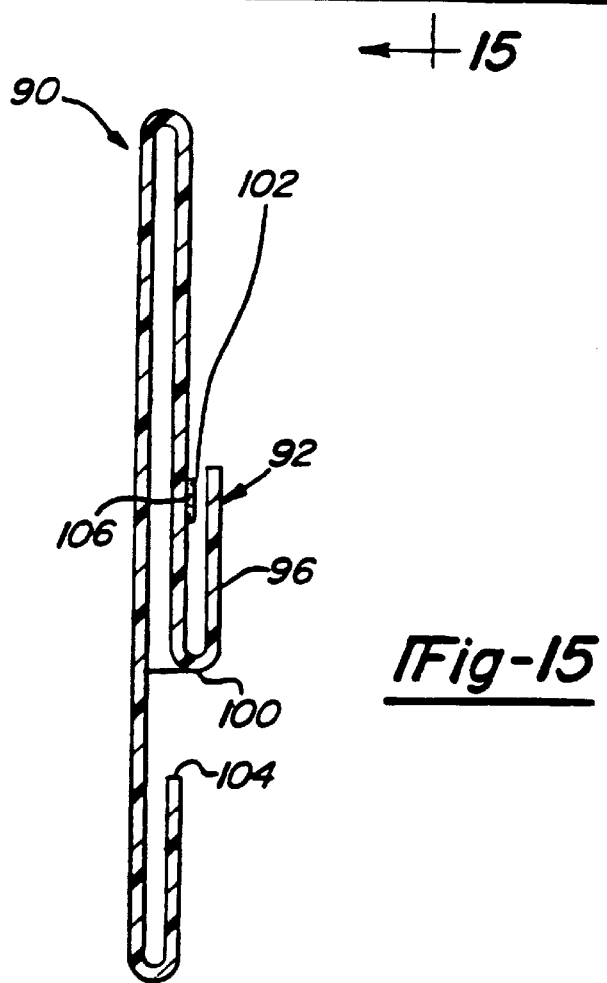
FIG. 15 is a cross-sectional view of the seat cover of FIG. 14 taken along lines 15—15.
Figure 16:
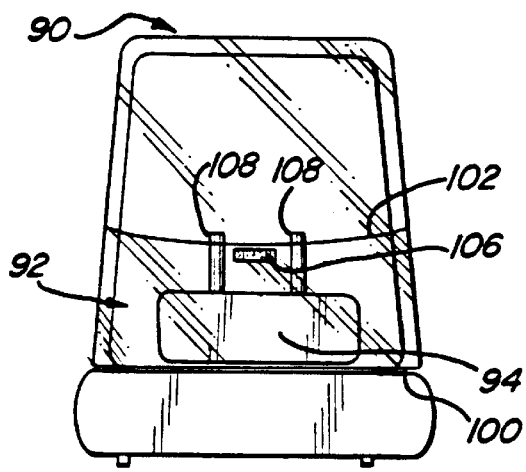
FIG. 16 is a rear view of the seat cover of FIG. 14 showing the headrest installed in the pouch.

In many cases it is desirable to have uninstalled seat accessories attached to the seat prior to their installation. FIGS. 14–16 depict an embodiment of the present invention adapted to meet this need. In particular, the seat cover 90 shown in FIGS. 14–16 is similar to seat cover 10 shown in FIG. 3, but is adapted to include a third pouch 92 for holding an uninstalled headrest 94. As best viewed in FIG. 15, the headrest pouch 92 is formed by folding up a flap 96 which is then sealed along with edges 98, in a manner similar to edges 33 in FIG. 3. This forms a pouch having a fold 100 at the bottom and an opening 102 at the top to permit insertion of headrest 94.

An additional advantage of this embodiment is that it involves less scrap material than the seat cover 10 shown in FIG. 3. This is because the strip of material left between slits 30 and 28 in FIG. 3 is not wasted, but instead a slit is made along line 104 and the material folded up to form flap 96. Further, an adhesive strip 106 may be employed to permit closing of the pouch 92 to better secure the headrest 94 inside the pouch 92. In addition, it should be noted that the pouch 92 may also be used to store documents associated with the seat. Alternatively, the headrest 94 may be installed with its mounting posts 108 pointing downward and protruding through the fold 100 of the pouch 92 as a way to secure the headrest 94 in the pouch.

Figure 17:
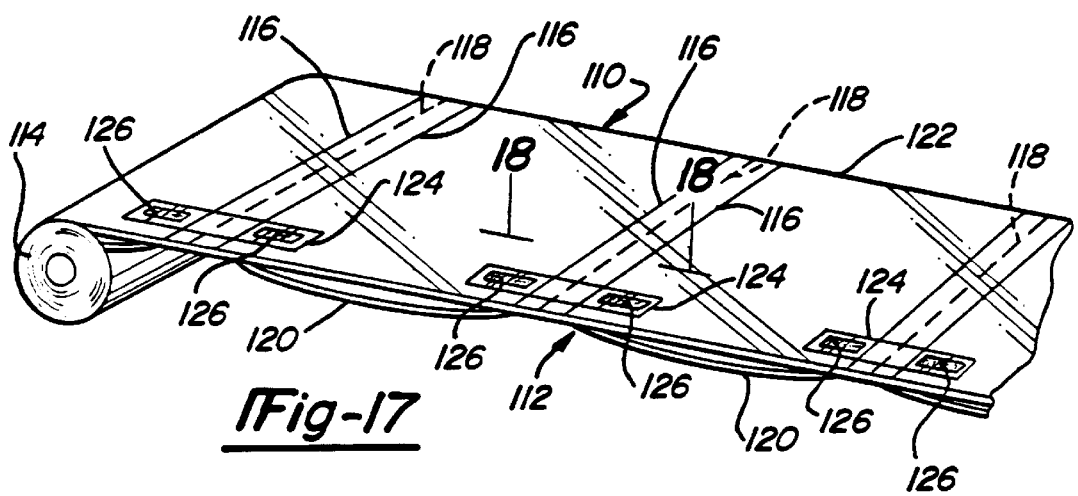
FIG. 17 is a view of a roll of temporary headrest covers in accordance with another embodiment of the present invention.
Figure 18:
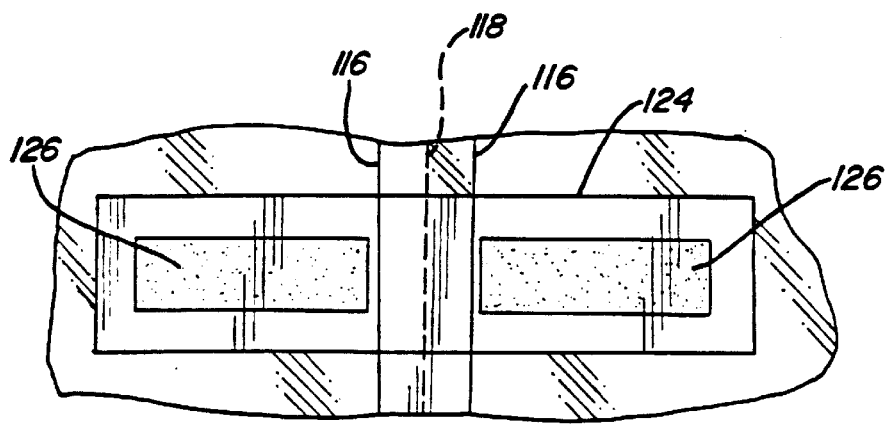
FIG. 18 is view of a release film used with the headrest cover shown in FIG. 17.

Referring now to FIGS. 17 and 18 there is shown an alternative means for protecting a headrest before, during and after installation. In particular, a headrest cover 110 is produced in a manner similar to the seat cover 10 described above on a continuous sheet 112 that is formed into a roll 114. The headrest cover 110 has seal lines 116 which are formed in a manner similar to the seal lines 40 shown in FIG. 3 as discussed above. Perforated lines 118 separate individual headrest covers. The cover has an open end 120 and a bottom 122. A release film 124 is applied to the covers 110 across the perforation and seal lines 116 and 118. Adhesive strips 126 may be attached to the covers 110 in a manner similar to adhesive strips 24 described above in connection with FIG. 3. Preferably, adhesive strips 126 may be first applied to the release film 124. Thus, when the release film (which is untreated) is applied to the covers 110 (which are treated in the area that the release film is to be applied), the adhesive strips 126 will adhere securely to the covers 110 and will remain adhered to the covers after the film 124 is removed.

If the release film 124 is applied to the covers prior to the sealing and perforating operations, then, as described above in connection with FIGS. 11–13, the release film will be permanently attached to the cover 110 at the seal point and will not require separate disposal after use. The completed headrest cover may be simply be slipped over top of the headrest with the open end facing downward. Then the sides containing the adhesive strips 126 which protrude somewhat from the edges of the headrest may be wrapped around the headrest and adhered to the surface of the cover 110.

Figure 19:
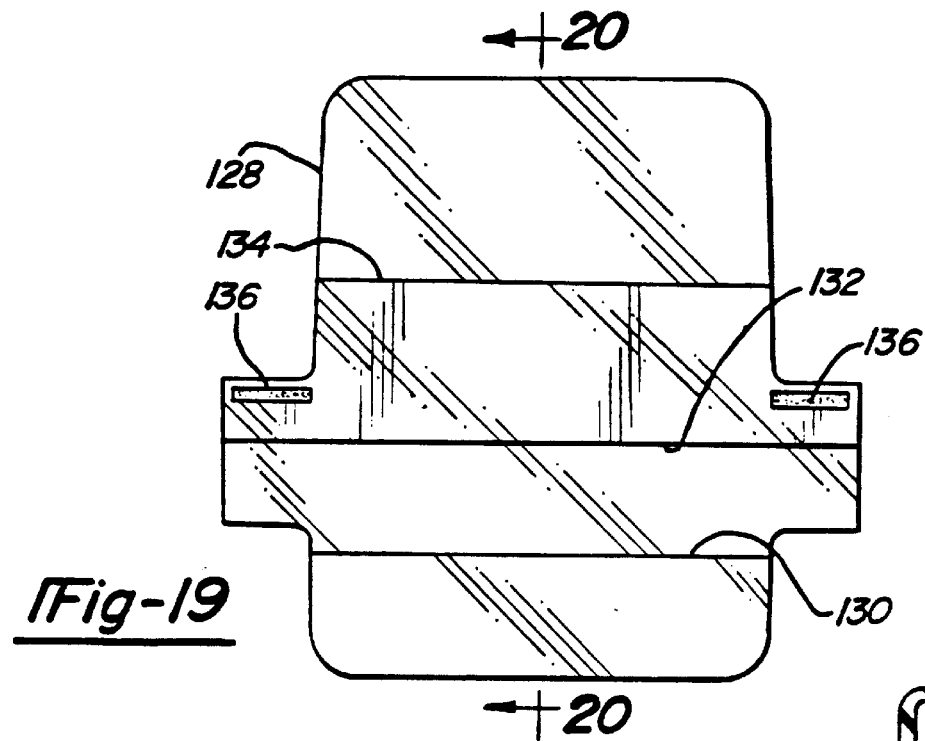
FIG. 19 is a plan view of one embodiment of a seat cover having a folded over portion for protecting its adhesive.
Figures 20, 21:
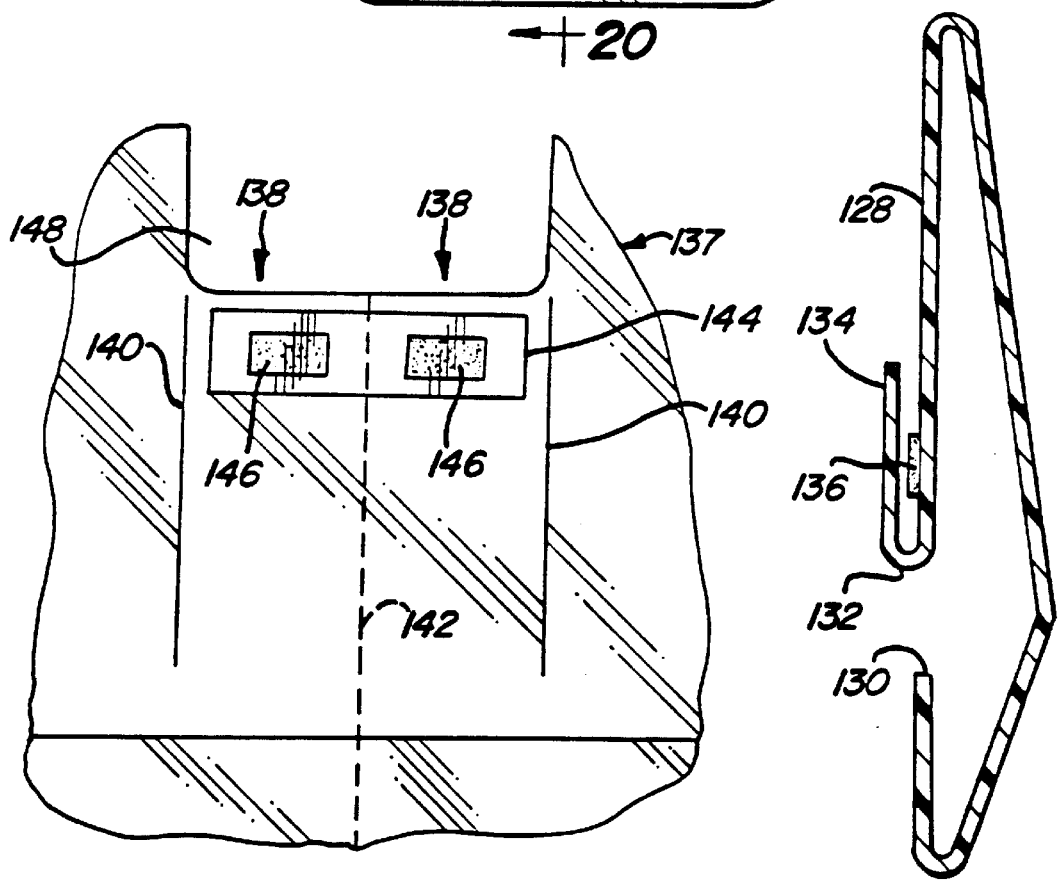
FIG. 20 is a cross-sectional view of the seat cover shown in FIG. 19 taken along line 20—20.
FIG. 21 is a partial view of an alternative embodiment of the seat cover shown in FIG. 3 having attaching flap extending in a transverse direction.

Referring now to FIGS. 19 and 20, an additional embodiment of a seat cover 128 is shown. The seat cover 128 is similar to the seat cover 10 in FIG. 3 with the exception that the rear surface of the seat cover is slit along lines 130, but instead of slitting the seat cover at line 28 as shown in FIG. 3, the seat cover is folded at that line corresponding to line 132 in FIG. 19. This creates flap 134 which is attached to adhesive strips 136. This flap 134 is then used as an adhesive cover film to prevent unwanted adhesions prior to installation. In addition, one advantage of this embodiment is that no separate film is required since the protective film is part of the seat cover itself. Further, as was the case with the headrest pouch disposed in FIGS. 14–16, the use of the flap 134 eliminates the wasted strip of material that was removed in the embodiment shown in FIG. 3. It should be noted that in this embodiment the adhesive strip 136 is first applied to the seat cover 128 on an area which is treated with the corona discharge process while the flap 134 is left untreated so that it may be subsequently removed from the adhesive 136.

Referring now to FIGS. 21 and 22, there is shown an alternative embodiment of a seat cover 137 having a transverse flap which provides improved strength. The alternative flaps 138, shown in FIGS. 21 and 22 are used in a manner similar to the flaps 22 shown in FIG. 3, with the exception that the flaps 138, are shorter and wider. That is, the base of the flaps have a seal line 140 which is much longer than the seal point 40 shown in FIG. 3. This provides greater strength for the flap. This seat cover 137 utilizes a perforated line 142 as well as a release film 144 and adhesive 146 which is similar to the release film shown in the embodiment of FIGS. 11–13. Another advantage of this embodiment is that less material is used since the cut-out area 148 can be made smaller.

Referring now to FIGS. 23–26, there is shown a multi-purpose protective cover which may be used for seats or other articles during shipment and assembly without requiring external fasteners, such as staples, tape, etc., to secure the goods. The cover 150 as with other embodiments of the invention may be manufactured from a continuous tube of plastic which is slit at slit point 152. The cover 150 is then folded at point 154 which creates a flap portion 156. The cover 150 is sealed at seal lines 158, and perforation lines 160 are created to permit separation of adjacent covers. The covers 150 may then be rolled up on a roll 162. A release liner 164, similar to the liner disclosed in FIGS. 11–13, may then be applied to the flap 156. The side of the flap 156 having the adhesive is treated with corona discharge to ensure that the adhesive will remain, and cover 150 in area 166 is also treated to ensure that the adhesive 164 will stick to that area. Some adjustability in the size of the cover 15 is possible, as shown in FIGS. 25 and 26. Thus, as shown in FIG. 25, the adhesive 164 may be applied at a considerable distance from the slit point 152 to decrease the size of the cover. In FIG. 26, it can be seen that the adhesive 164 is attached close to the slit point 152, thereby increasing the size of the cover to accommodate larger items.

Thus, there is disclosed in the above description and in the drawings, several illustrative embodiments of the invention which fully and effectively accomplish the objects thereof. However, it will be apparent that variations in the details of the apparatus may be indulged in without departing from the sphere of the invention herein described, or the scope of the appended claims.

What is claimed is:

1. A temporary seat cover comprising:
    a two-layer flexible member having an upper pocket for enclosing a seat back therein, and a lower pocket for enclosing a seat bottom cushion therein;
    a tab connected to said flexible member generally intermediate said upper and lower pocket; and
    an adhesive means associated with said tab, wherein said tab is adapted to be wrapped around a portion of said seat and adhered to the surface of said pocket covering said seat portion to secure said seat cover to said seat.

2. The seat cover of claim 1, wherein said tab is made of both layers of said two-layer flexible member and has its edges sealed together.

3. The seat cover of claim 2, further comprising seal points wherein said two layers of said flexible member are fused together, said seal points being located near the base of said tab, whereby forces pulling on said tab are resisted by both layers of said flexible member at said seal points.

4. The seat cover of claim 1, wherein said tab is centrally located on a top layer of said flexible member near the junction of said seat back and bottom, and said tab passes between said seat back and bottom to adhere to a bottom layer of said flexible member.

5. The seat cover of claim 1, wherein said tab is located near one edge of said flexible member and said tab is wrapped around the side of said seat to adhere to a bottom layer of said flexible member.

6. The seat cover of claim 5, further comprising a second tab substantially identical to said tab but located on an opposite side of said flexible member and wrapped around an opposite side of said seat.

7. The seat cover of claim 6 wherein said tabs are generally rectangular in shape.

8. The seat cover of claim 1, wherein said two-layer flexible member is formed of a continuous sheet said continuous sheet also forming a plurality of seat covers, said plurality of said seat covers being demarcated into separate seat covers by means of a perforated edge.

9. The seat cover of claim 1, wherein said two-layer flexible member is manufactured in an extruded tubular form.

10. The seat cover of claim 1, wherein said adhesive is applied to said flap by spraying.

11. The seat cover of claim 10 wherein said adhesive is a hot melt acrylic.

12. The seat cover of claim 10 wherein said seat tab is treated with a corona discharge process before said adhesive is applied.

13. A temporary seat cover comprising:

a two-layer flexible member having an upper pocket for enclosing a seat back therein, and a lower pocket for enclosing a seat bottom cushion therein;

a tab connected to said flexible member at its base; and an adhesive means attached to one side of said upper pocket wherein said tab is adapted to be wrapped around a portion of said seat and adhered to said one side of said upper pocket to secure said seat cover to said seat.

14. The seat cover of claim 13 wherein said adhesive means comprises a pair of adhesive strips.

15. The seat cover of claim 13 wherein said adhesive is applied to said upper pocket by spraying.

16. The seat cover of claim 15 wherein said upper pocket is treated with a corona discharge process before said adhesive is applied.

17. A temporary seat cover comprising:

a two-layer flexible member having an upper pocket for enclosing a seat back therein, and a lower pocket for enclosing a seat bottom cushion therein;

a tab connected to said flexible member at its base; and an adhesive means for attaching said tab to said upper pocket, wherein said tab is adapted to be wrapped around a portion of said seat and adhered to the other side of said pocket covering said seat portion to secure said seat cover to said seat.

* * * * *